(12) United States Patent
Sarafianos et al.

(10) Patent No.: US 9,716,502 B1
(45) Date of Patent: Jul. 25, 2017

(54) PROTECTION OF AN INTEGRATED CIRCUIT

(71) Applicant: STMicroelectronics (Rousset) SAS, Rousset (FR)

(72) Inventors: Alexandre Sarafianos, Trets (FR); Bruno Nicolas, Aubagne (FR)

(73) Assignee: STMicroelectronics (Rousset) SAS, Rousset (FR)

( * ) Notice: Subject to any disclaimer, the term of this patent is extended or adjusted under 35 U.S.C. 154(b) by 0 days.

(21) Appl. No.: 15/379,155

(22) Filed: Dec. 14, 2016

(30) Foreign Application Priority Data

May 17, 2016 (FR) ...................... 16 54371

(51) Int. Cl.
*H03K 19/00* (2006.01)
*G01T 1/24* (2006.01)
*H03K 19/177* (2006.01)
*H01L 23/00* (2006.01)
*H03K 19/003* (2006.01)

(52) U.S. Cl.
CPC ..... *H03K 19/17768* (2013.01); *H01L 23/576* (2013.01); *H03K 19/0033* (2013.01); *H03K 19/17704* (2013.01)

(58) Field of Classification Search
CPC ......... H03K 19/17768; H03K 19/0033; H03K 19/17704; H01L 23/576
USPC .......................................... 326/8; 250/370.01
See application file for complete search history.

(56) References Cited

U.S. PATENT DOCUMENTS

| 2005/0236683 | A1 | 10/2005 | Shapiro et al. |
| 2007/0182575 | A1 | 8/2007 | Kunemund |
| 2008/0059741 | A1* | 3/2008 | Croguennec ............. G11C 7/24 711/163 |
| 2009/0315603 | A1 | 12/2009 | Bancel et al. |
| 2011/0010775 | A1 | 1/2011 | Modave et al. |

* cited by examiner

*Primary Examiner* — Daniel D Chang
(74) *Attorney, Agent, or Firm* — Seed IP Law Group LLP

(57) ABSTRACT

An integrated circuit protection device, including: groups of radiation detection elements distributed in a matrix array; logic gates combining outputs of the detection elements in rows and in columns, each output of a detection element being connected to a gate combining a row and to a gate combining a column; and a circuit for interpreting signals supplied by said logic gates and including an event counter and a delay element.

20 Claims, 5 Drawing Sheets

PROTECTION OF AN INTEGRATED CIRCUIT

BACKGROUND

Technical Field

The present disclosure generally relates to electronic circuits and, more particularly, to the protection of an integrated circuit against fault injections by laser attack.

Description of the Related Art

In many applications, electronic circuits manipulate secret data, that is, data to which access is desired to be reserved to certain users or circuits.

There exist many methods, called attacks, to attempt discovering or pirating secret data. Among such attacks, so-called fault injection attacks comprise disturbing the circuit operation by acting on one or a plurality of bits that it manipulates. A category of fault injection attacks more particularly targeted by the present disclosure is laser attacks, which comprise pointing a laser beam on logic elements of the circuit to switch the bits processed by these elements. Examining the consequence of such an attack on the circuit behavior, be it by direct examination of the data supplied by the circuit or by indirect examination by executing a side channel attack, may enable the attacker to discover a secret.

Laser attacks generally are attacks carried out from the rear surface of the integrated circuit after a treatment comprising eroding the substrate.

To counter this type of attack, integrated circuits are generally equipped with detectors in the form of lead frames (mesh) or of photocurrent or current detectors. Another category of detectors more particularly targeted by the present disclosure comprises using flip-flop-type logic elements having as an only function to detect a state switching representative of an incidental or intentional disturbance.

The protection of integrated circuits against laser attacks needs to be improved.

BRIEF SUMMARY

An embodiment overcomes all or part of the disadvantages of usual techniques of protection against laser attacks.

An embodiment provides a solution particularly adapted to laser attacks focused on specific regions of the circuit.

An embodiment provides a solution to detect a laser attack before it occurs on an element critical in terms of the security of the data that it manipulates.

Thus, an embodiment provides an integrated circuit protection device, comprising:

groups of radiation detection elements distributed in a matrix array;

logic gates combining outputs of the detection elements in rows ad in columns, each output of a detection element being connected to a gate combining a row and to a gate combining a column; and a circuit for interpreting signals supplied by said logic gates and comprising an event counter and a delay element.

According to an embodiment, said circuit comprises a logic state machine having inputs individually connected to the outputs of said gates.

According to an embodiment, in the presence of an event detected by a detection element, said state machine activates the delay element and increments said counter.

According to an embodiment, in the presence of an event detected by a detection element, while the counter is at an initial value, said state machine increments said counter.

According to an embodiment, in the presence of an event detected by a detection element, while the delay element is active, said state machine increments said counter if the interval between the location of the current event and of a previous event is shorter than a given distance.

According to an embodiment, said counter is reset at the end of the delay.

According to an embodiment, the detection elements are flip-flops.

According to an embodiment, the logic gates are OR-type gates.

An embodiment provides an integrated circuit comprising a protection device.

The foregoing and other features and advantages will be discussed in detail in the following non-limiting description of dedicated embodiments in connection with the accompanying drawings.

DETAILED DESCRIPTION

Figure 1:
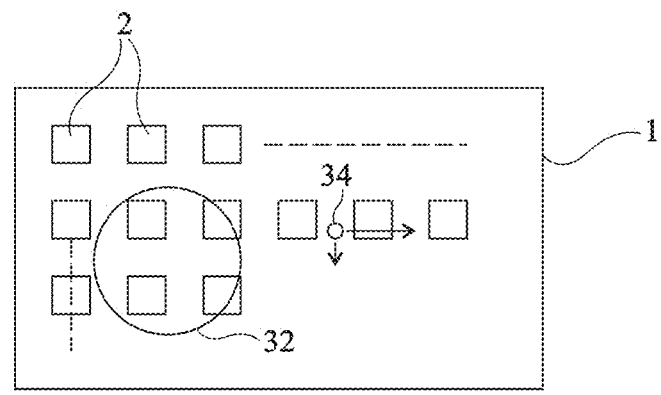
FIG. 1 is a simplified rear view of an integrated circuit illustrating the state of the art and the problem to solve.

The same elements have been designated with the same reference numerals in the different drawings. In particular, the structural and/or functional elements common to the different embodiments may be designated with the same reference numerals and may have identical structural, dimensional, and material properties. For clarity, only those steps and elements which are useful to the understanding of the described embodiments have been shown and will be detailed. In particular, the functions which are desired to be protected, be they actual data or executed algorithms, or those of the electronic circuits executing them have not been detailed, the described embodiments being compatible with usual applications.

FIG. 1 is a simplified rear view of an integrated circuit 1 illustrating the state of the art and the problem to solve. The representation of FIG. 1 is very simplified and only partially shows the circuit.

Circuit 1 is equipped with fault detectors 2 regularly distributed on its surface, at least in the critical areas in terms of the security of the manipulated data. Each detector 2 typically is a flip-flop, for example, a D flip-flop having a state which will be modified by the arrival of a radiation from the rear surface. All flips-flops are connected to an analysis circuit which triggers a countermeasure, for example, a resetting of the circuit, for the slightest detected disturbance.

The implantation of detectors of this type necessarily takes space in circuit 1 and they are thus distributed with an interval depending on the desired detection accuracy.

In the past, the laser beams used have a beam diameter (spot) 32 such that the beam would necessarily touch one of the detectors during an attack. However, laser attacks are now carried out with more focused beams and thus with a much smaller impact diameter on the circuit. Such new attacks enable to get around certain countermeasures.

In particular, a laser attack now generally starts with a scanning of the rear surface of circuit 1 to determine the positions of the detectors. Indeed, due to the fineness of beam 34, by scanning the circuit, the times when the circuit reacts, that is, when a detector has been touched, and the times when the circuit does not react will be alternated. This enables the attacker to create a mapping of the detectors to then focus the attack on unprotected areas where faults can be injected.

It could have been envisaged to decrease the number of detectors. However, there comes a time when this is no longer possible since there would then be no more space for the useful elements of the circuit.

Further, the focusing of the laser beams becomes such that a detector is incapable of telling a photon originating from a laser from an alpha particle originating, for example, from cosmic radiation.

According to the described embodiments, it is provided to integrate in the circuit networks or groups of radiation detectors in the form of networks or groups of flip-flops. Further, a specific interpretation of the signals from these flip-flops taking into account a temporal aspect is preferably provided.

The function of the described detection device is to detect a laser scanning of the circuit which generally is the step prior to an actual laser attack. Thus, the attack is detected before it is exploited on one of the critical components in terms of security of the manipulated data.

Figure 2:
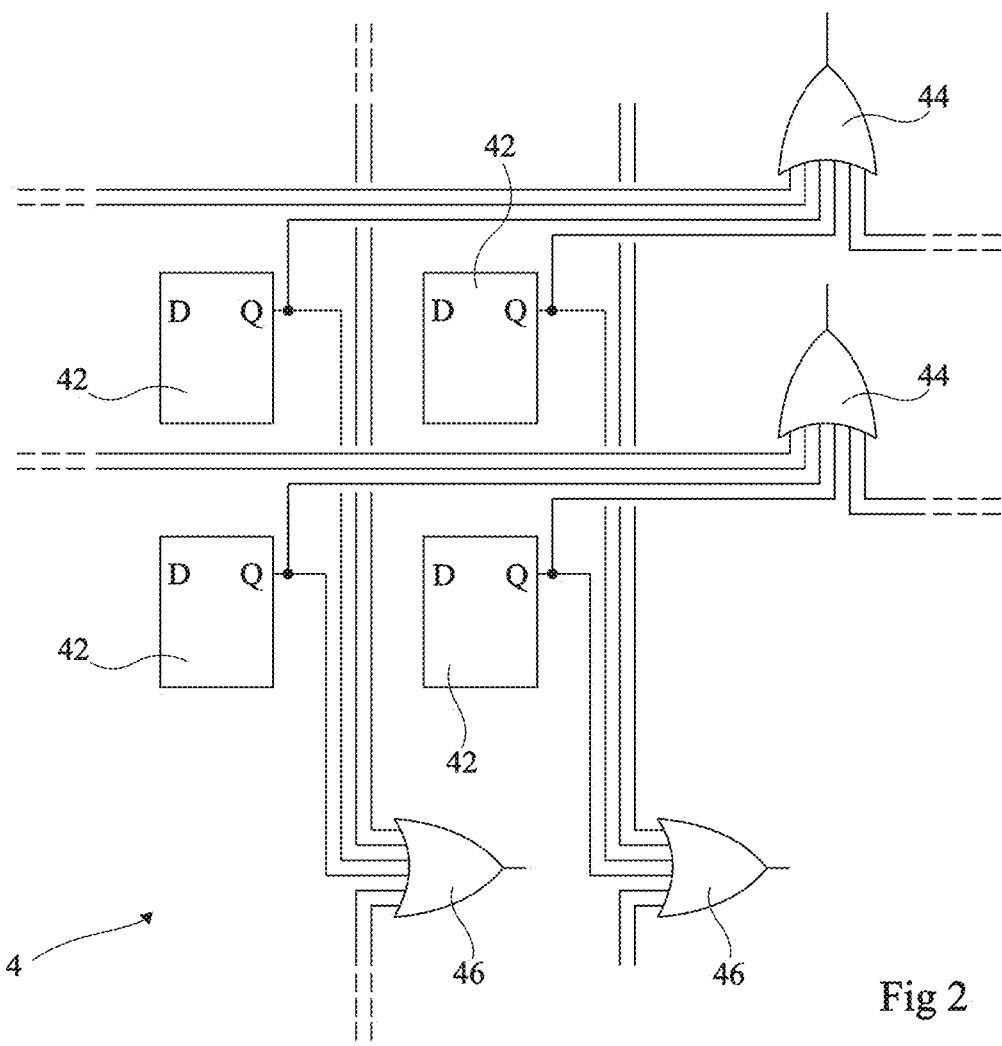
FIG. 2 schematically and partially shows an embodiment of a laser attack detection architecture.

FIG. 2 schematically and partially shows an embodiment of a laser attack detection circuit 4.

According to this embodiment, the detection circuit 4 includes, at preferably regular intervals in the circuit to be protected, integrated groups of detection elements, such as flip-flops 42, for example, of four flip-flops 42, arranged in an array. Each flip-flop 42 is, for example, a D flip-flop having its data input grounded and having its Q direct output connected to respective inputs of two OR-type logic gates 44 and 46. Each logic gate 44 receives as inputs the signals from the flip-flops of a given row. Each logic gate 46 receives the signals from the flip-flops of a given column. Thus, each flip-flop 42 is connected to a row gate 44 combining the signals of the flip-flops in the row and to a column gate 46 combining the signals of the flip-flops in the column.

Figure 3:
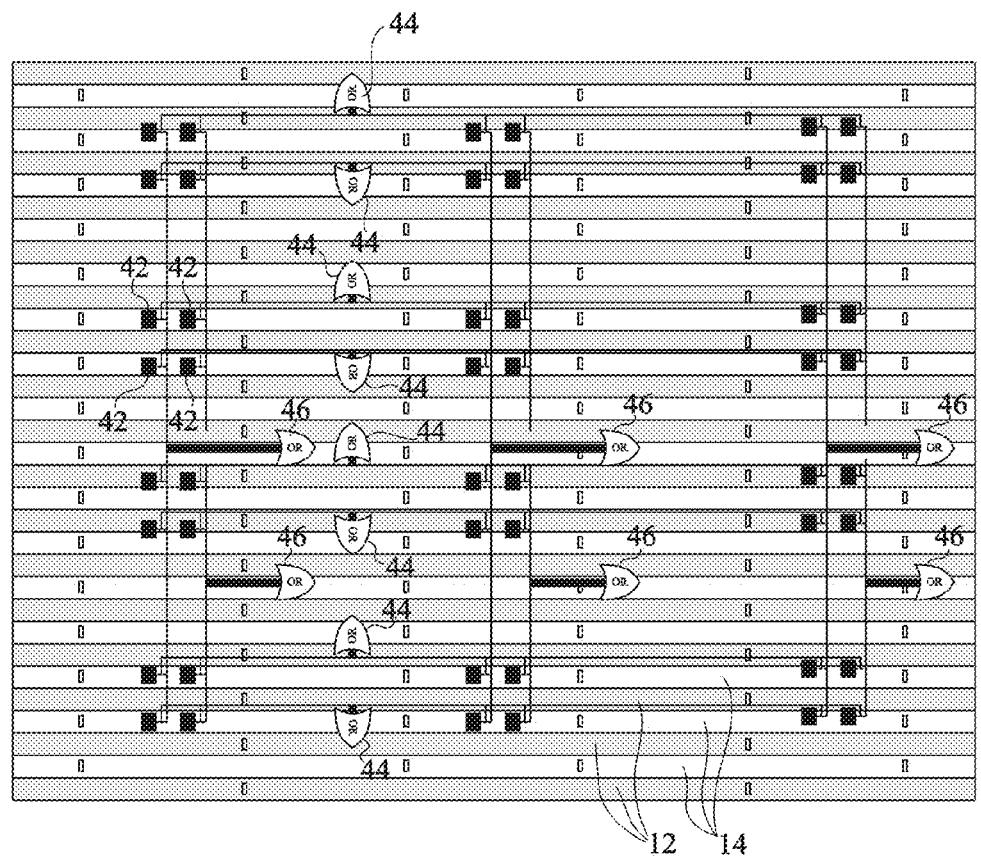
FIG. 3 schematically shows an integrated circuit equipped with an embodiment of a laser attack detection architecture.

FIG. 3 schematically shows an integrated circuit equipped with an embodiment of a laser attack detection architecture such as shown in FIG. 2.

In the example of FIG. 3, the alternated succession of P-type wells 12 and of N-type wells 14, having logic transistors of the protected circuit formed therein, has been schematically and horizontally illustrated. This representation is very simplified and simply illustrates that the protection architecture is integrated in the logic area of the protected circuit of the integrated circuit.

FIG. 3 arbitrarily shows the case of an array of three columns and four rows of groups of four flip-flops 42 each.

The shown architecture or detection device thus comprises six column gates 46 (two per column) and eight row gates 44 (two per row).

When the circuit is powered, all flip-flops are in a quiescent state at 0. If one of the flip-flops is hit by a laser beam, its output state will change and switch the output of the two gates 44 and 46 to which its Q output is connected.

Figure 4:
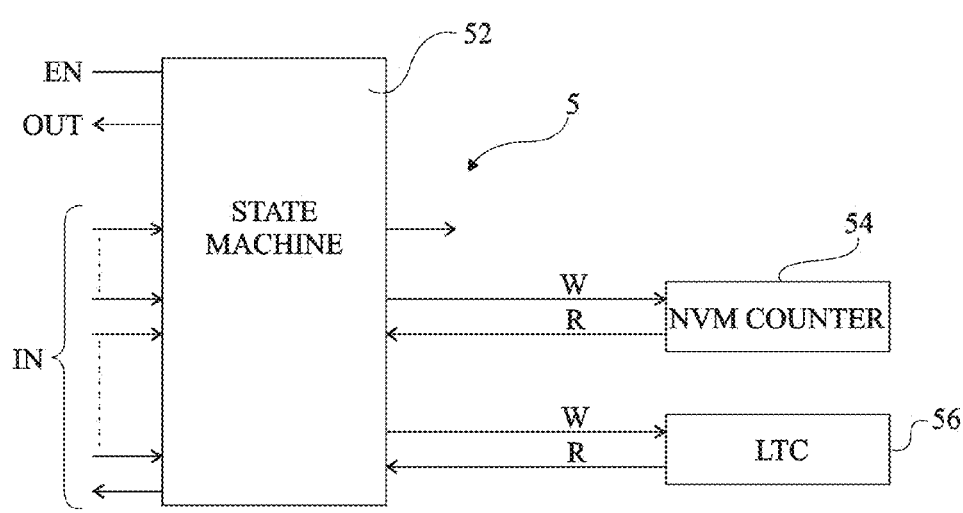
FIG. 4 schematically shows in the form of blocks an embodiment of a circuit for interpreting signals supplied by the architecture of FIG. 2.

FIG. 4 schematically shows in the form of blocks an embodiment of a circuit 5 for interpreting signals supplied by the detection circuit 4 of FIGS. 2 and 3.

Circuit 5 comprises a state machine, preferably a state machine 52 in wired logic or a programmable logic array (FPGA), having inputs IN individually connected to the respective outputs of gates 44 and 46 of the detector 4 (FIG. 3). Circuit 5 also comprises a counter, such as a non-volatile memory counter 54 (NVM COUNTER) and a delay line such as a long time constant (LTC) delay line 56. Counter 54 is written W and read R by state machine 52. The delay line is activated W and its state (active or expired delay) is read R by state machine 52. Circuit 5 further comprises an activation input EN which enables, if need be, to activate/deactivate the protection according to the phases of device use, and an output OUT supplying a signal indicative of a detected attack.

The delay line 56 may be implemented by any of many known delay circuits. For example, the delay line 56 may include a resistor and capacitor connected between a voltage supply and ground, a reset transistor positioned between the capacitor and the voltage supply, and a comparator having one input coupled to receive a voltage across the capacitor and a second input coupled to receive a threshold voltage. To activate the delay line, the reset transistor can be closed to charge the capacitor to the voltage level of the voltage supply and then opened to begin discharging the capacitor. The comparator detects when the capacitor voltage reaches the threshold voltage and outputs a signal to the state machine 52 to indicate that the delay of the delay line 56 has expired.

The operation of circuit 5, more specifically of its state machine 52, is the following.

In the idle state, state machine 52 waits for a switching of one of its inputs IN. Counter 54 is assumed to be at zero and the delay line 56 is assumed to be inactive.

On occurrence of a state switching of an input IN, state machine 52 increments counter 54 and activates delay line 56.

As long as the delay line is active, that is, as its time constant has not expired, if another state switching of one of inputs IN appears, the state machine determines whether the switching originates from a flip-flop close to the previous one. If it does, counter 54 is incremented again and delay line 56 is also activated again, that is, the time constant is reset.

The interpretation of the counter is performed by state machine 52, which periodically compares the state of counter 54 with a threshold. As soon as the threshold has been reached, the presence of an attack is considered and state machine 52 switches the state of its output OUT.

Once the time constant of delay line 56 has elapsed and no state switching has occurred, counter 54 is reset.

The taking into account of the location of the event in the array to determine whether a next event occurs nearby enables to tell a laser scanning from alpha particles randomly reaching the circuit.

The selection of the distance of the neighborhood taken into account (flip-flops from the same group, next and previous columns, next and previous rows and columns, etc.) depends on the granularity of the flip-flop groups in the circuit and on the expected speed of a laser scanning.

The selection of the time constant of delay line 56 also depends on the granularity of the flip-flop groups in the circuit and on the expected speed of a laser scanning.

The alarm triggering threshold, that is, the threshold from which output OUT switches depends on applications. For example, a threshold in the range from 2 to 10 detections is selected.

The reaction of the integrated circuit to a switching of output OUT preferably comprises blocking the protected circuit and not simply restarting. Indeed, if a scanning is detected, one is certain that the circuit will then be attacked by laser with a targeted attack. Any subsequent operation should thus be prevented. For example, the state machine 52 may activate a fuse in a non-volatile memory which definitively blocks the protected circuit.

Figure 5:
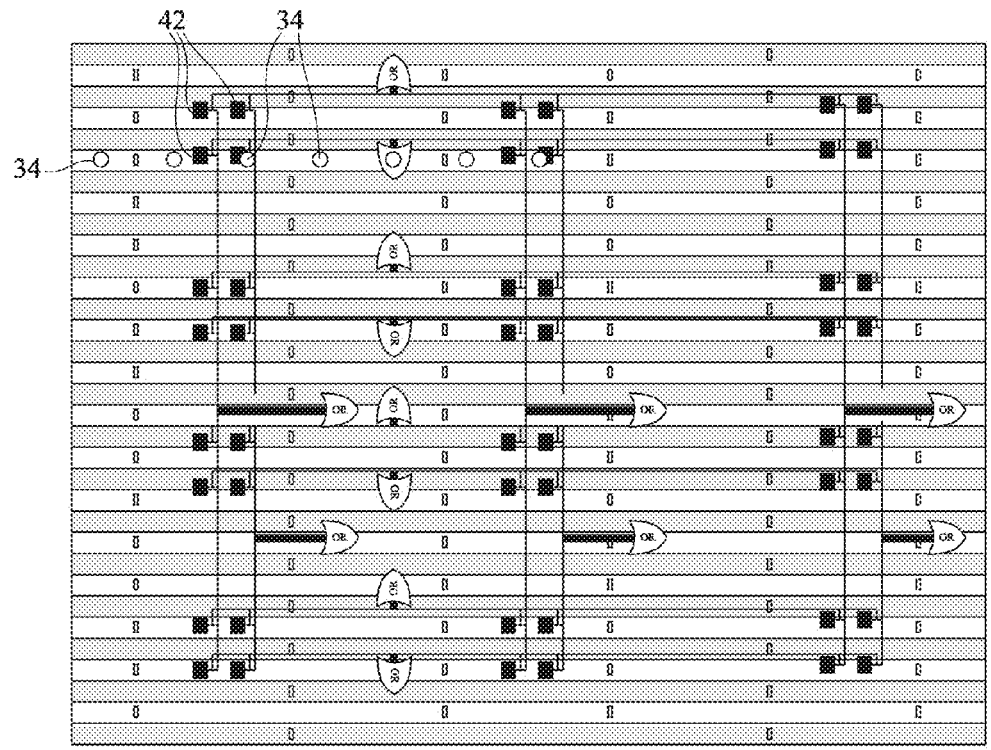
FIGS. 5, 6, and 7 illustrate in simplified views of an embodiment of an integrated circuit the operation thereof in the presence of different laser attack modes.
Figure 6:
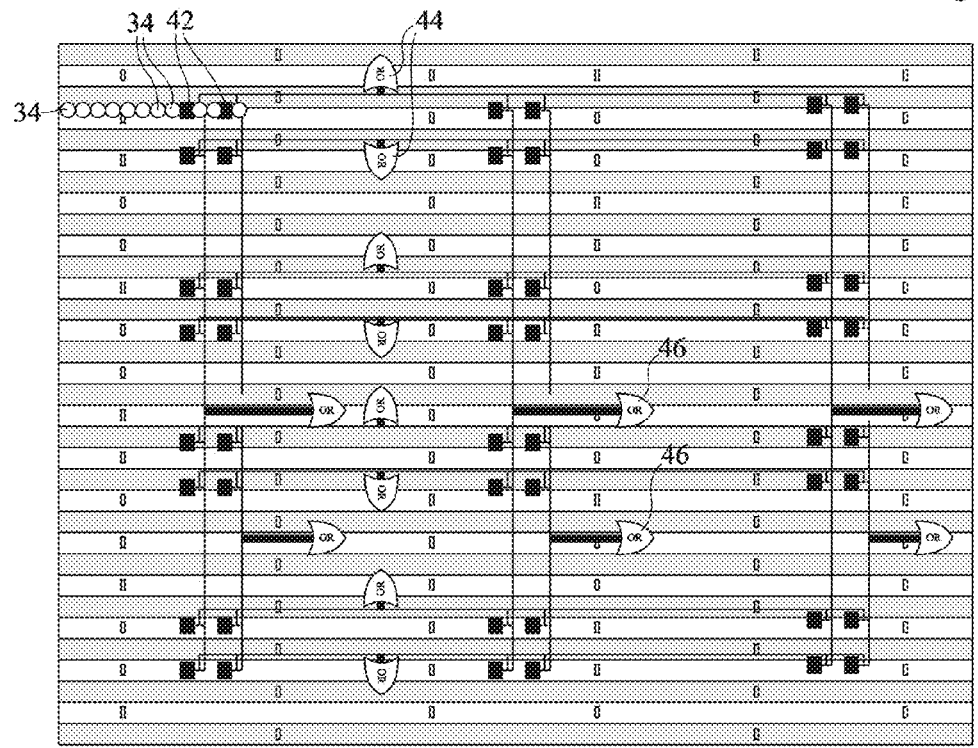
Figure 7:
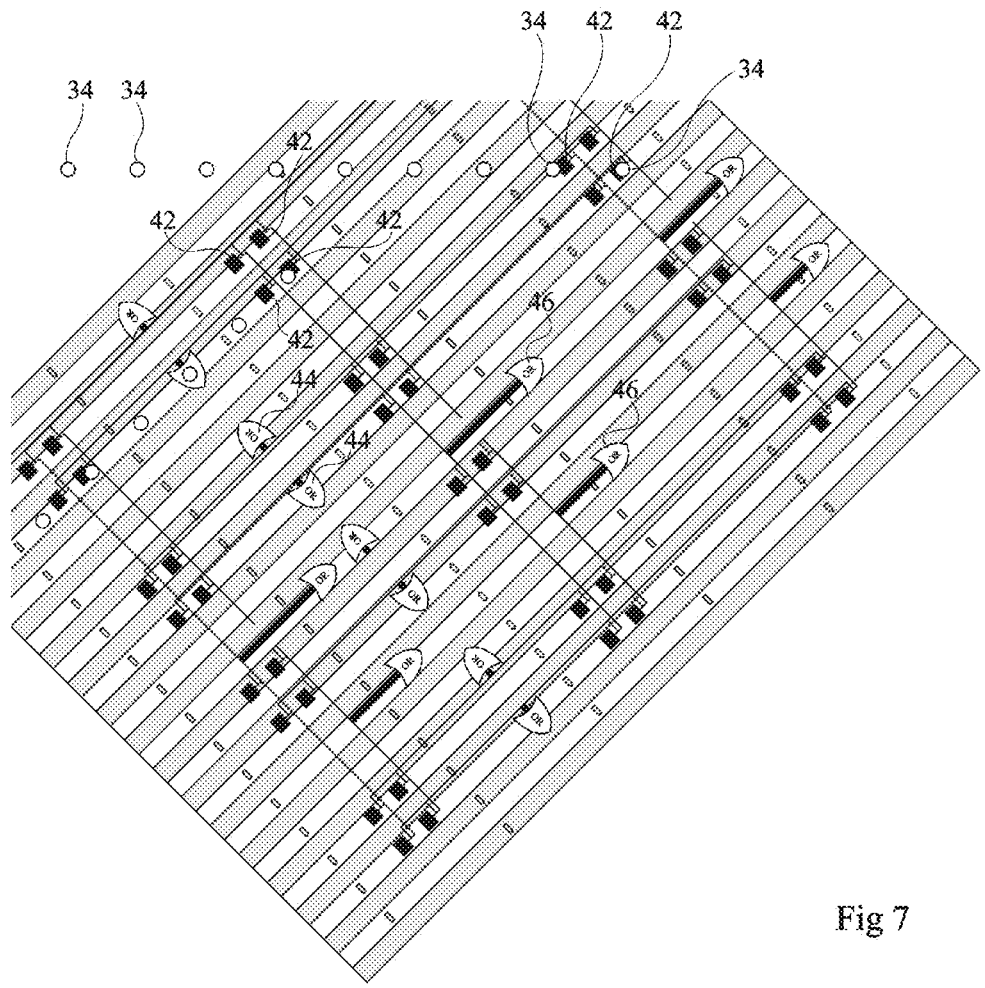

FIGS. 5, 6, and 7 illustrate, in simplified views, the operation of the integrated detection circuit 4, in the presence of different laser attack modes.

FIG. 5 illustrates the case of a scanning spaced by an interval greater than the interval between two flip-flops 42 of a group. Thus, laser beam 34 will touch a first flip-flop of a group but not the next flip-flop of the same group. However, this beam, during the scanning, will necessarily statistically touch a flip-flop of a next group, or even one of logic gates 44 of the row. If the configuration of state machine 52 is such that it takes into account the neighboring column, arbitrarily assuming in this example a threshold of 2 for the counter, the scanning attack is detected.

FIG. 6 illustrates the case of a continuous scanning, that is, where the laser spots touch each other. In this case, for example, with a threshold of 2 for counter 54, the triggering will be performed from as soon as the first group of flip-flops 42 crossed by the scanning.

FIG. 7 illustrates the case of an oblique scanning, that is, in the case where the scanning is not parallel to the rows or to the columns of the matrix array. However, laser spots 34 will however statistically reach a plurality of flip-flops 42 or gates 44 or 46. Accordingly, the scanning is here detected again.

Figure 8:
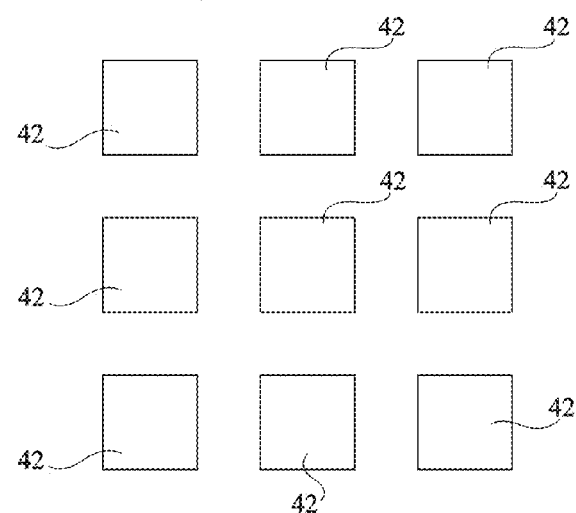
FIG. 8 schematically and partially shows a variation of the laser attack detection architecture.

FIG. 8 schematically and partially shows a variation according to which each group of flip-flops comprises nine flip-flops in a 3×3 matrix array rather than 4 flip-flops in a 2×2 matrix array. For simplification, only flip-flops 42 have been shown, but neither their connections, nor the rest of the architecture have been shown.

Figure 9:
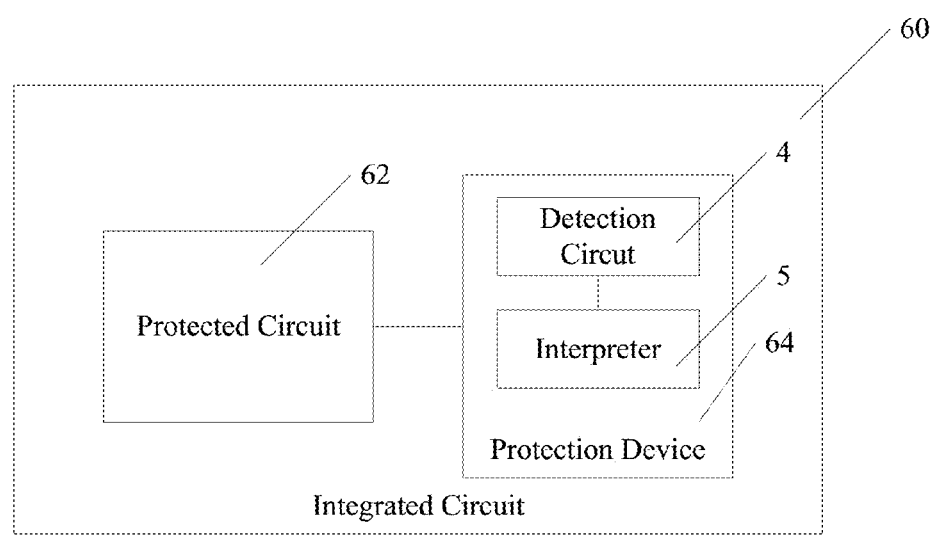
FIG. 9 is a block diagram of an integrated circuit that includes a protected circuit and a protection device, according to one embodiment of the present disclosure.

FIG. 9 is a block diagram of an integrated circuit 60, integrated on a semiconductor chip, according to one embodiment of the present disclosure. The integrated circuit 60 includes a protected circuit 62 and a protection device 64 that includes the detection circuit 4 and interpreter circuit 5. As described above, the detection circuit 4 and interpreter circuit 5 of the protection device 64 protect the protected circuit from laser attacks. The protected circuit 62 could be any integrated circuit, including a microcontrol unit, memory, etc.

An advantage of the described embodiments is that unlike usual systems, there is no immediate reaction in the presence of a switching of a detection element (a flip-flop). Thus, a pirate does not realize, by carrying out the scanning, that a detector has been touched.

An advantage of the described embodiments is that the risk of taking into account incidental radiations is very low. Indeed, such radiations will touch the circuit at random positions and, accordingly, will not trigger the threshold.

Various embodiments have been described. Various alterations, modifications, and improvements will occur to those skilled in the art. In particular, the number and the granularity of the groups of detection flip-flops depends on the application, on the size of the integrated circuit, on the desired sensitivity, etc. Further, although flip-flops have been taken as an example, the detection elements are more generally formed of any logic element sensitive to a laser radiation. In particular, logic gates 44 and 46 may also form detection elements. Finally, the practical implementation of the embodiments which have been described is within the abilities of those skilled in the art based on the functional indications given hereabove.

Such alterations, modifications, and improvements are intended to be part of this disclosure, and are intended to be within the spirit and the scope of the present disclosure. Accordingly, the foregoing description is by way of example only and is not intended to be limiting.

The various embodiments described above can be combined to provide further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

What is claimed is:

1. An integrated circuit protection device, comprising:
   groups of radiation detection elements distributed in a matrix array;
   row logic gates combining outputs of the detection elements in rows and column logic gates combining outputs of the detection elements in columns, each detection element output being connected to one of the row gates and to one of the column gates; and
   an interpreter configured to interpret signals supplied by said row and column logic gates and including:
      an event counter coupled to the row and column logic gates and configured to count detection events detected by one or more of the radiation detection elements; and
      a delay element configured to set a time period for counting the detection events by the event counter.

2. The device of claim 1, wherein said interpreter comprises a logic state machine having inputs individually connected to outputs of said gates.

3. The device of claim 1, wherein said interpreter includes a state machine configured to activate the delay element and increment said counter in response to a first radiation event detected by a first one of the detection elements.

4. The device of claim 3, wherein the state machine is configured to compare a count value of the counter with a threshold value and disable a protected circuit in response to determining that the count value has reached the threshold value.

5. The device of claim 3, wherein said state machine is configured to:
   determine whether a second radiation event is detected by a second one of the detection elements that is within a predetermined range of the first detection element,
   increment said counter if the second detection element is within the predetermined range of the first detection element, and reset said counter if the second detection element is not within the predetermined range of the first detection element.

6. The device of claim 3, wherein delay element is configured to reset said counter in response to the time period elapsing.

7. The device of claim 1, wherein the detection elements include flip-flops.

8. The device of claim 1, wherein the logic gates are of OR type.

9. An integrated circuit comprising:
a protected circuit; and
a protection device coupled to the protected circuit and including:
groups of radiation detection elements distributed in a matrix array adjacent to the protected circuit;
row logic gates combining outputs of the detection elements in rows and column logic gates combining outputs of the detection elements in columns, each detection element output being connected to one of the row gates and to one of the column gates; and
an interpreter configured to interpret signals supplied by said row and column logic gates and including:
an event counter coupled to the row and column logic gates and configured to count detection events detected by one or more of the radiation detection elements; and
a delay element configured to set a time period for counting the detection events by the event counter.

10. The integrated circuit of claim 9, wherein said interpreter comprises a logic state machine having inputs individually connected to outputs of said gates.

11. The integrated circuit of claim 9, wherein said interpreter includes a state machine configured to activate the delay element and increment said counter in response to a first radiation event detected by a first one of the detection elements.

12. The integrated circuit of claim 11, wherein the state machine is configured to compare a count value of the counter with a threshold value and disable a protected circuit in response to determining that the count value has reached the threshold value.

13. The integrated circuit of claim 11, wherein said state machine is configured to:
determine whether a second radiation event is detected by a second one of the detection elements that is within a predetermined range of the first detection element,
increment said counter if the second detection element is within the predetermined range of the first detection element, and
reset said counter if the second detection element is not within the predetermined range of the first detection element.

14. The integrated circuit of claim 11, wherein delay element is configured to reset said counter in response to the time period elapsing.

15. The integrated circuit of claim 9, wherein the detection elements include flip-flops.

16. A protection method, comprising:
detecting radiation events using groups of radiation detection elements distributed in a matrix array;
combining outputs of the detection elements in rows using row logic gates and in columns using column logic gates, each detection element output being connected to one of the row gates and to one of the column gates; and
interpreting signals supplied by said row and column logic gates, the interpreting including:
counting, using a counter, detection events detected by one or more of the radiation detection elements; and
setting a time period, using a delay element, for counting the detection events by the event counter.

17. The method of claim 16, wherein the interpreting includes activating the delay element and incrementing said counter in response to a first radiation event detected by a first one of the detection elements.

18. The method of claim 17, wherein the interpreting includes comparing a count value of the counter with a threshold value and disabling a protected circuit in response to determining that the count value has reached the threshold value.

19. The method of claim 17, wherein the interpreting includes:
determining whether a second radiation event is detected by a second one of the detection elements that is within a predetermined range of the first detection element,
incrementing the counter if the second detection element is within the predetermined range of the first detection element, and
resetting said counter if the second detection element is not within the predetermined range of the first detection element.

20. The method of claim 16, including resetting the counter in response to the time period elapsing.

* * * * *